June 30, 1959  T. F. ZLOTEK  2,892,523
SPRAG RETAINER FOR ONE-WAY CLUTCHES
Filed Nov. 4, 1957  2 Sheets-Sheet 1
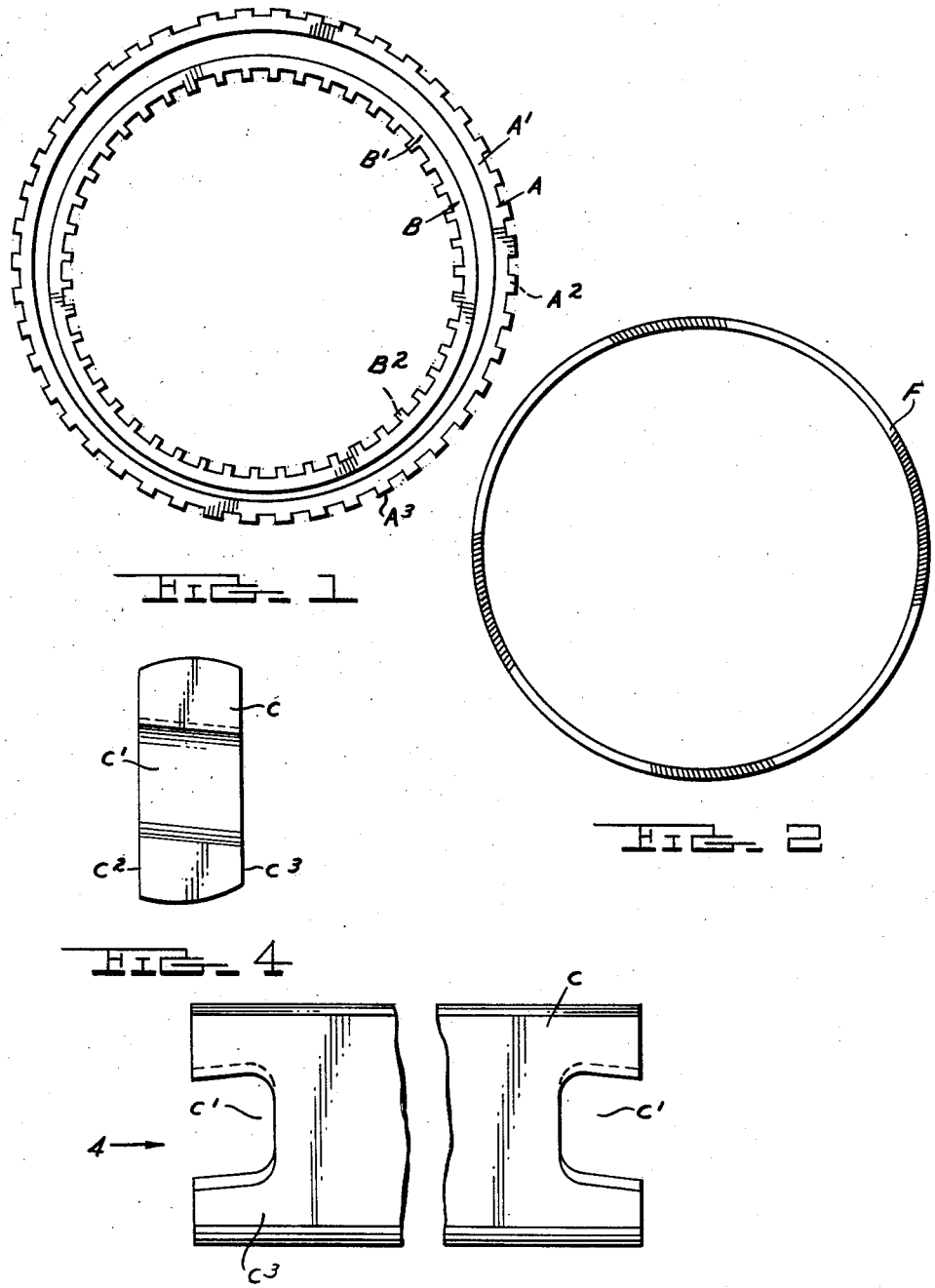
INVENTOR.
THADDEUS F. ZLOTEK
BY
Whittemore Halbert & Belknap
ATTORNEYS June 30, 1959   T. F. ZLOTEK   2,892,523
SPRAG RETAINER FOR ONE-WAY CLUTCHES
Filed Nov. 4, 1957   2 Sheets-Sheet 2
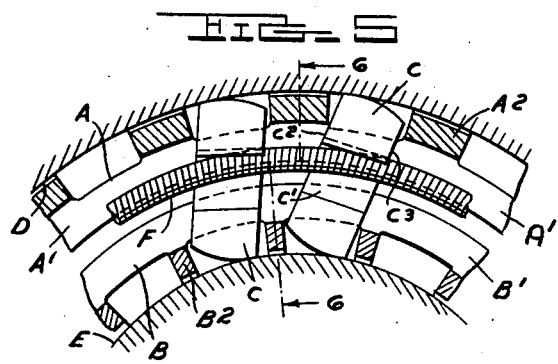
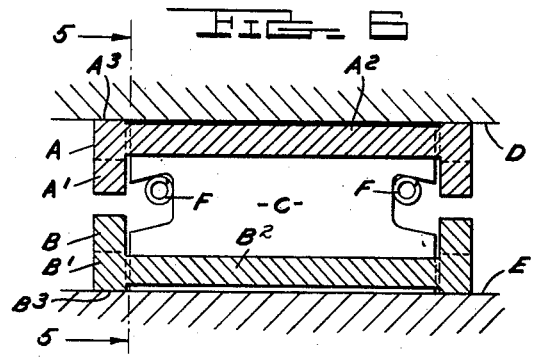
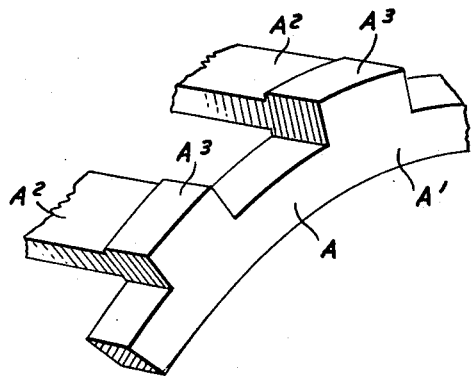
INVENTOR.
THADDEUS F. ZLOTEK
BY
Whittemore Hulbert & Belknap
ATTORNEYS

United States Patent Office 2,892,523
Patented June 30, 1959

2,892,523

SPRAG RETAINER FOR ONE-WAY CLUTCHES

Thaddeus F. Zlotek, Detroit, Mich., assignor to Formsprag Company, Van Dyke, Mich., a corporation of Michigan Application November 4, 1957, Serial No. 694,224

3 Claims. (Cl. 192—45.1)

The invention relates to one-way clutches of the sprag type and has more particular reference to the sprag retainer construction.

In the stressing of a clutch structure of this type incident to the picking up of the torque load, the sprags must roll upon and advance along their inner and outer raceways in opposite directions. Where the sprags are assembled in a retainer the latter must be so constructed as to permit such sprag movements, usually by providing individual clearances which allow each sprag to operate independent of the others. Thus, in the operation of the clutch under certain conditions, such as the presence of vibrations in the structure, some of the sprags may clutch in advance of the others and by interlocking their raceways prevent proper engagement of the remainder. This will throw all of the load on less than the whole number of the sprags in the series and may result in breakage.

It is the object of the invention to obtain a construction of retainer which will compel substantially simultaneous and equal rolling movements of all of the sprags, thereby insuring that all will cooperate in the carrying of the torque load. To this end the invention consists in the construction of a retainer formed of two separate members having in the sprag assembly limited rotary movement in opposite directions with respect to each other. The invention further consists in the construction in which these separate retainer members engage respectively the inner and outer end portions of the sprags radially thereof so that rolling movement of any one will compel simultaneous rolling movements of the others. The invention further consists in various advantageous features of the more specific construction as hereinafter set forth.

In the accompanying drawings:

Fig. 1 is a side elevation of the two retainer members positioned in slightly eccentric relation to each other.

Fig. 2 is a side elevation of the energizing garter spring.

Fig. 3 is a side elevation of one of the sprags.

Fig. 4 is an end elevation thereof.

Fig. 5 is a side elevation partly in section on line 5—5 of Fig. 6.

Fig. 6 is a section on line 6—6 of Fig. 5.

Fig. 7 is a perspective view of a portion of the outer rotary member showing the limited bearing areas for contact with the race member.

The sprag retainer comprises separate outer and inner members A and B, each having annular side portions A' and B' for engaging opposite ends of the sprags C and respectively adjacent to outer and inner race members D and E. The side portions A' and B' are connected to each other by cross bars $A^2$ and $B^2$ spaced from each other for reception of the sprag C therebetween. Thus, the contacts between each sprag and the cross bars of the outer and inner members is adjacent to its outer and inner ends and any rolling movement of one sprag will compel the same rolling movement of all of the others. In other words, such rolling movement will rotate one of said retainer members in one direction and the other in the opposite direction.

The sprags C are provided with end notches C' for receiving energizing garter springs F, preferably helical coils. These, as shown in Fig. 5, are biased to expand radially, bearing against each sprag to rotate it in a counter-clockwise direction into initial contact with both raceways D and E. However, in the stressing of the parts in picking up torque load the sprags must rotate and roll further, after which the two raceways will be locked in fixed relation to each other while rotating in this direction. It will thus be understood that if one sprag were to roll in advance of others, it by interlocking the raceways would prevent rolling movement of any other sprag to properly stress the same and share the torque load. Such advance rolling is, however, prevented as the two retainer members will communicate like movements to all sprags of the series.

To permit assembling the sprags with the retainer they must be inserted between cross bars and consequently are preferably formed with parallel front and rear sides $C^2$, $C^3$ and are slightly less in width than the space between cross bars. The garter springs must be engaged with the notches C' after such insertion of the sprags and therefore must be introduced between the side portions A', B' of the outer and inner race members. It is desirable however that these side members should restrain the garter springs from throwing out from the notches in the sprags which might occur through their open ends under high speed operation. To perform this function the annular space between the portions A' and B' is made of a radial width such that when these members are concentric, it will be less than the cross sectional diameter of the garter spring. This will not however prevent assembly, for these springs can be inserted progressively while the retainer members are slightly eccentric from each other, as shown in Fig. 1. They cannot however accidentally escape when the clutch is in operation for the race members will hold the retainer members in concentric relation.

The order of assembling the elements just described is first to insert the sprags endwise between the cross bars of the retainer members and then to insert the energizing springs between the ring portions A' and B' and into engagement with the notches C'. When thus positioned they will hold the sprags from detachment as they not only are in engagement with the notches therein but are also inside of the cross bars. This forms a transportable unit assembly which may be inserted between the race members of the clutch.

The retainer members form bearings for the respective raceways and to avoid any danger of adhering thereto have only limited areas of contact. Preferably the portions $A^3$ and $B^3$ of the rings A' and B' at the ends of each cross bar are in bearing contact with the raceways while between these portions in the rings and also between these end portions of the cross bar greater clearance is provided. This will also provide free access of the lubricant to said bearing areas.

What I claim as my invention is:

1. A one-way clutch of the sprag type comprising a retainer formed of separate inner and outer annular members, each including rings for embracing longitudinally opposite ends of the sprags, and cross bars spaced for engaging and relatively positioning radial opposite end portions thereof, sprags having notched opposite ends and energizing garter springs within said notches, each pair of inner and outer rings being radially spaced from each other sufficiently to permit, while free for eccentric movement, of progressively inserting said garter springs therebetween into the notches of said sprags, but when such rings are held coaxial, said radial spacing is less than the cross sectional diameter of the garter springs to retain the latter in said notches.

2. The construction as in claim 1 in which said ring portions have spaced small areas for bearing on the adjacent raceway with increased clearance for other portions thereof and also for said cross bars.

3. The construction as in claim 1 in which the cross bars of the outer and inner retainer members hold said garter springs therebetween and said springs by their engagement with the notched ends of the sprags hold the latter from disengagement between said cross bars.

References Cited in the file of this patent

UNITED STATES PATENTS

| | | |
|---|---|---|
| 2,486,262 | Davis | Oct. 25, 1949 |
| 2,824,636 | Troendly et al. | Feb. 25, 1958 |